(12) United States Patent
Swan

(10) Patent No.: US 7,633,549 B2
(45) Date of Patent: Dec. 15, 2009

(54) APPARATUS AND METHOD FOR IMAGE RENDERING

(75) Inventor: Philip Swan, Richmond Hill (CA)

(73) Assignee: ATI Technologies, Inc., Markham, Ontario (CA)

( * ) Notice: Subject to any disclaimer, the term of this patent is extended or adjusted under 35 U.S.C. 154(b) by 840 days.

(21) Appl. No.: 10/837,991

(22) Filed: May 3, 2004

(65) Prior Publication Data

US 2005/0243203 A1 Nov. 3, 2005

(51) Int. Cl.
*H04N 11/20* (2006.01)

(52) U.S. Cl. .................. 348/448; 348/441; 348/452; 348/459

(58) Field of Classification Search .......... 348/448, 348/441, 449–452, 699–701, 97, 402, 413, 348/416, 459; 358/486, 509; *H04N 11/20*
See application file for complete search history.

(56) References Cited

U.S. PATENT DOCUMENTS

| 5,335,013 | A | * | 8/1994 | Faber ................... 348/104 |
| 5,689,305 | A | | 11/1997 | Ng et al. |
| 5,784,115 | A | | 7/1998 | Bozdagi |
| 5,805,207 | A | * | 9/1998 | Watkinson et al. .......... 348/97 |
| 2002/0101535 | A1 | | 8/2002 | Swan |
| 2003/0156301 | A1 | | 8/2003 | Kempf et al. |
| 2005/0078214 | A1 | | 4/2005 | Wong et al. |

FOREIGN PATENT DOCUMENTS

| EP | 0690617 A2 | 1/1996 |
| EP | 0739129 A2 | 10/1996 |
| EP | 1207693 A2 | 5/2002 |
| EP | 1515543 A2 | 3/2005 |

OTHER PUBLICATIONS

Bock, A.M.; Motion-adaptive standards conversion between formats of similar field rates; Signal Processing Image Communication; Jul. 31, 1993; pp. 275-280.
Woods, John W. et al.; Hierarchical Motion Compensated De-interlacing; SPIE; Nov. 11, 1991; pp. 805-810.
De Haan, Gerard et al.; Deinterlacing—An Overview; IEEE; Sep. 1998; vol. 86, No. 9; pp. 1839-1857.
European Search Report from European Patent Office; European Application No. EP05252564; dated Aug. 29, 2005.

* cited by examiner

*Primary Examiner*—Trang U Tran
(74) *Attorney, Agent, or Firm*—Vedder Price, P.C.

(57) ABSTRACT

An apparatus and method for image rendering includes a first buffer operative to receive first video data. A motion mad updater receives video data from the first buffer and updates a motion map using the first video data. A grain information generator is coupled to the first buffer and receives the first video data to generate slope information based on the first video data. A grain information filter receives the slope information and filters the slope information to generate filtered slope information. A spatially interpolated field generator receives the filtered slope information and generates a spatially interpolated field. A maximum difference value generator generates a maximum difference value based on the update motion map. A base value generator receives the first video data and the spatially interpolated field and generates a base value therefrom. A missing video data generator generates missing first video data.

30 Claims, 2 Drawing Sheets

APPARATUS AND METHOD FOR IMAGE RENDERING

FIELD OF THE INVENTION

The present invention relates generally to image processing and more specifically to rendering and interlacing image data.

BACKGROUND OF THE INVENTION

Progressive display devices display all lines of an image every refresh. In contrast, interlaced display devices, such as NTSC and PAL television displays, typically display images using even and odd line interlacing. To display interlaced video on a progressive display, video rendering systems have to generate pixel data for scan lines that are not received in time for the next frame update. This process is called de-interlacing. For applications such as High Definition Television (HDTV), it is often necessary to display video in a different resolution or in a window on another video image.

A problem in processing video images exists particularly for personal computers having multimedia capabilities since interlaced video information received from conventional video tapes, cable television broadcasters (CATV), digital video disks (DVD's) and direct broadcast satellite (DBS) systems must be de-interlaced for suitable display on a progressive (non-interlaced based) display device, and scaled and re-interlaced by a television encoder for display on an interlaced display device.

A current video compression standard, known as MPEG-2 specifies the compression format and decoding format for interlaced and non-interlaced video picture information. MPEG-2 video streams have picture data divided as blocks of data. These blocks of data are referred to as macroblocks in the MPEG-2 standard. Generally, a macroblock of data is a collection of Y, Cr, Cb (color space) blocks which have common motion parameters. *Therefore, a macroblock of data contains a section of the luminance component and spatially corresponding chrominance components. A macroblock of data can either refer to source, decoded data or to the corresponding coded data elements. Typically, a macroblock of data (macroblocks) consists of blocks of* 16 pixels by 16 pixels of Y data and 8 by 8, or 16 by 16 pixels of Cr and Cb data in one field or frame of picture data.

Generally, in MPEG-2 systems, two fields of a frame may be coded separately to form two field pictures. Alternatively, the two fields can be coded together as a frame. This is known generally as a frame picture. Both frame pictures and field pictures may be used in a single video sequence. A picture consists of a luminance matrix Y, and two chrominance matrices (Cb and Cr).

MPEG-2 video streams also include data known motion vector data that is solely used by a decoder to efficiently decompress the encoded macroblock of data. A motion vector, referred to herein as a decoding motion vector, is a two-dimensional vector used for motion compensation that provides an offset from a coordinate position in a current picture to the coordinates in a reference picture. The decoder uses the decoding motion vector data stream to reference pixel data from frames already decoded so that more compact difference data can be sent instead of absolute data for those referenced pixels or macroblocks. In other words, the motion vector data is used to decompress the picture data in the video stream. Also, zero decoding motion vectors may indicate that there was no change is pixel data from a previously decoded picture.

Several basic ways of de-interlacing interlaced video information include a "weave" method and a "bob" method. With the "weave", or merge method, successive even and odd fields are merged. Each frame to be displayed is constructed by interleaving the scan lines of a pair of fields. This "weave" method is generally most effective with areas of a picture that do not have motion over successive frames because it provides more pixel data detail for non-moving objects. However, when motion does occur, artifacts appear in the form of double images of a moving object. An artifact called "Comb Tearing" or "Feathering" appears around the periphery of a horizontally moving object causing poor image quality. Images with vertically motion also have artifacts.

In contrast to the "weave" method, the "bob" method displays single fields as frames. The missing scan lines are interpolated from available lines in the field making the frame rate the same as the original field rate. The most often used methods are line repetition, line averaging and edge-adaptive spatial interpolation. Again, this de-interlacing method is also not typically used with some form of motion detection so that non-moving images can appear to be blurry from loss of image detail. This can result from inaccurate interpolation of pixel data. The "bob" technique introduces flicker that is noticeable in video sequences with no motion. This occurs because even when the scene is static, two different frames are created—one based on the even field and one based on the odd field. These frames are generally different. Where they are different, flicker occurs as the display alternates between the two frames.

There are a number of techniques categorized as motion adaptive de-interlacing. These use different de-interlacing strategies in picture areas with and without motion. Generally, "bob" is used in picture areas with motion and "weave" is used in picture areas without motion. Often, separate de-interlacers and/or separate motion detection hardware is used to carryout the above methods, as well as separate hardware for scaling and re-interlacing video (TV encoder). However, separate de-interlacers, motion detection, scaling and re-interlacing hardware can add additional cost to a graphics processor.

Graphics processors are known to include 2D/3D engines that fetch data from a frame buffer and blend pixels together to render an image and place the blended data back in the frame buffer. The frame buffer is memory accessible by the graphics processor. Such graphics processors are also known to include display engines which obtain rendered images from the frame buffer and may subsequently perform simple deinterlacing operations (such as "bob" and "weave"), but do not typically rewrite the deinterlaced information back to the frame buffer. As known in the art, the specifics of operations supported by 2D/3D engines vary. Also, it is not uncommon among 2D/3D engines for the same operation to use a different number of passes on different chips. Lighting and multi-texture affects are examples of features where different implementations partition the signal processing steps differently to achieve a tradeoff between die area, complexity, memory bandwidth, and performance. The feature sets of 2D/3D engines evolve rapidly to make them more and more efficient at the tasks for which they are most frequently programmed.

Accordingly, there is a need for an improved graphics processor that performs de-interlacing, weaving and scaling image rendering for television encoding.

DETAILED DESCRIPTION OF THE PREFERRED EMBODIMENTS

Briefly, the present invention includes an apparatus and method for image rendering including a first buffer operative to receive first video data. The first buffer may be any suitable type of buffer, including but not limited to a ring buffer and the video data may any suitable type of video data including but not limited to video data of a Y data type. The method and apparatus further includes a motion map updater coupled the first buffer and operative to receive video data from the first buffer. The motion map updater updates a motion map using the first video data.

The method and apparatus further includes a grain information generator coupled to the first buffer and operative to receive the first video data. The grain information generator is operative to generate grain information based on the first video data. The method and apparatus further includes a grain information filter operative to receive the grain information and operative to filter the grain information to generate filtered grain information.

A spatially interpolated field generator is coupled to the grain information filter, the spatially interpolated field generator is operative to receive the filtered grain information and operative to generate a spatially interpolated field. A maximum difference value generator is coupled to the motion map updater and is operative to generate a maximum difference value based on the update motion map.

A base value generator operative to receive the first video data and the spatially interpolated field from the spatially interpolated field generator, the base value generator operative to generate a base value therefrom. The method and apparatus further includes a missing video data generator operative to receive the maximum difference value, the spatially interpolated field and the base value such that the missing video data generator is operative to generate missing first video data. The missing first video data may then be weaved with the non-missing field data to produce a frame. The frame can then be combined with other video data, such as UV video data, a background colour, VBI information, watermarks, other video feeds, and/or graphics, to generate an output display.

Figure 1:
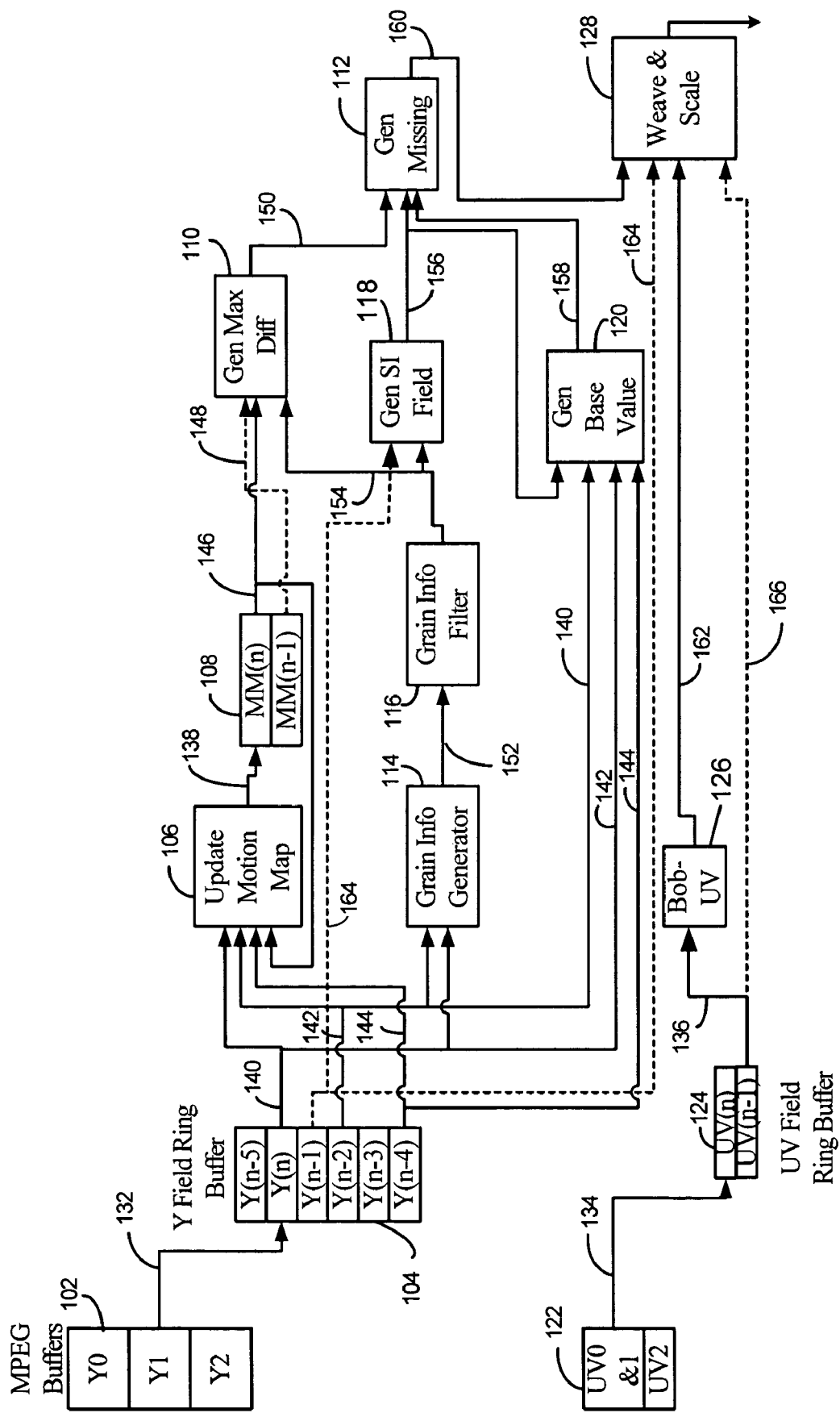
FIG. 1 illustrates an apparatus for image rendering in accordance with one embodiment of the present invention.

More specifically, FIG. 1 illustrates an apparatus for image rendering 100 including first image data buffers 102, field buffers 104, an update motion map module 106, an update motion map memory device 108, a maximum difference value generator 110 and a missing data generator 112. The apparatus further includes a grain information generator 114, a grain information filter 116, a spatially interpolated field generator 118, and a base value generator 120. In embodiment of the apparatus 100 further includes second image data buffers 122, second image data field buffers 124, an image data bobber 126 and a weave and scale module 128.

The elements of the apparatus 100 may provide for data processing operations in response to executable instructions. The elements may be disposed within one or more processors or may represent executable operations performed by one or more processors. The elements may be implemented in hardware, software or any other suitable implementation recognized by one having ordinary skill in the art. Any processor may be may be, but not limited to, a single processor, a plurality of processors, a DSP, a microprocessor, ASIC, state machine, or any other implementation capable of processing and executing software or discrete logic or any suitable combination of hardware, software and/or firmware. The term processor should not be construed to refer exclusively to hardware capable of executing software, and may implicitly include DSP hardware, ROM for storing software, RAM, and any other volatile or non-volatile storage medium.

The apparatus 100, in one embodiment of the present invention, utilizes an algorithm including multiple loopback passes and at least one scaling pass for weaving and scaling deinterlaced frames.

In one embodiment, the buffers 102 receive Y data in MPEG format. The buffers 122 receive UV data from the original signal including video data in YUV format. It is noted that the present embodiment is shown processing YUV formatted data but that any other suitable data type may be processed with modifications as recognized by one having ordinary skill in the art. Y formatted image data 132 may be temporarily stored in the field buffer 104, wherein in one embodiment the field buffer may be a ring buffer. In a first processing pass, the Y formatted image data 132 may be maintained in the field buffer 104. It should also be noted that the MPEG Buffers 102 and the ring buffers 104 can use the same storage memory. The illustration shows a separate ring buffer for store Y field information.

UV formatted image data 134 may be temporarily stored in the field buffer 124, wherein in one embodiment the field buffer may be a ring buffer. In a first processing pass, the UV formatted image data 134 may be maintained in the field buffer 104.

The update motion map 106 receives video information 140, 142 and 144 from the field buffer 104. In one embodiment, the update motion map 106 receives the original data field 140, the second image 142 and the fourth image 144. Using the update motion map module 106, an update motion map 138 is generated.

The update motion map module 106 may operate in accordance with executable instructions to perform calculations to generate the updated motion map 138. In one embodiment, the update motion map module 106 generates the updated motion map 138 based on equation 1.

$$M(n)[y] = \text{clamp}(M(n)[y] - MMDecayConstant) \\ *MMDecayFact + GreaterOf((|F(n-2)[y] - F(n)[y] \\ |-d2)*f2,(|F(n-4)[y] - F(n)[y]|-d4)*f4);$$  Equation 1

In Equation 1, the F(n), F(n−2) and F(n−4) represent fields from the video data 140, 142 and 144. In one embodiment, the GreaterOf function of Equation 1 may be zeroed during the pass using the constants f2 and f4. Zeroing will be required when a new stream is started (i.e. after a channel change) because initially the fields F(n−2) and F(n−4) will invalid.

In one pass, clamp(M(n)[y]−MMDecayConstant) is implemented on the fourth input, the updated motion map 146 from the update motion map memory device 108. The MMDecayConstant value is set to a predetermined constant value based on system operations, as recognized by one having ordinary skill in the art and for this pass in this embodiment should initially be set to 40. MMDecayFact may be controlled offsetting the third input of video data 144 by an offset value recognized by one having ordinary skill in the art and for this pass in this embodiment, it may initially be set to one.

In one embodiment, this update motion map is stored in the buffer 108. In a non-first pass, another update motion map may be stored within the memory 108 wherein the update motion map 106 is operative to also receive the previous update motion map 146 from the memory 108.

The maximum difference generator 110 is operative to receive the update motion map 146 from the memory 108. In one embodiment, a previous update motion map 148 is also provided to the maximum difference generator 110. The maximum difference generator is operative, in response to executable instructions, to generate the maximum difference value 150 in accordance with Equation 2.

$$\text{MaxDiff}=f\{\text{graininfo},M[y-1],M[y],M[y+1]\}, \qquad \text{Equation 2}$$

In Equation 2, the function "f" may be consistent with Equations 3-7.

$$\text{MaxDiff\_}L=\text{LesserOf}(M[y-1][x-1],M[y+1]-1]) \qquad \text{Equation 3}$$

$$\text{MaxDiff\_}C=\text{LesserOf}(M[y-1][x+0],M[y+1][x-+0]) \qquad \text{Equation 4}$$

$$\text{MaxDiff\_}R=\text{LesserOf}(M[y-1][x+1],M[y+1][x-+1]) \qquad \text{Equation 5}$$

$$\text{MaxDiff\_}D=\text{LesserOf}(M[y-1][x],M[y+1][x]) \qquad \text{Equation 6}$$

$$\text{MaxDiff}=\text{GreaterOf}(\text{MaxDiff\_}L,\text{MaxDiff\_}C, \text{MaxDiff\_}R,\text{MaxDiff\_}D,M[y][x]) \qquad \text{Equation 7}$$

In the embodiment of FIG. 1, the grain information generator 114 is operative to receive video data from the ring buffer 104. The grain information generator is operative to generate grain information, as described in further detail below, using the original video data 140 and the second video data 142. The grain information generator 114 is operative to generate grain information 152. The grain information filter 116 is operative to receive the grain information 152 and generate filtered grain information 154, as described in further detail below.

The present invention further includes the grain information generator 114. The grain information may be generated using Equation 2, in one embodiment of the present invention.

$$\text{Graininfo}=f\{F(n)[y],F(n-1)[y-1],F(n-1)[y+1],F(n-2)[y]\} \qquad \text{Equation 8}$$

The Graininfo field contains both a value describing the grain estimates and a value indicating the confidence in the estimates. Preliminary weighted estimate of the grain of the image as calculated using the grain information generator 114. Conceptually, pixels travel from right to left as the image is passed through the apparatus 100. Using a baseline grain analyzer, the lines in the current field that are above and below the missing line are needed. These two lines are referred to as the "before" and "after" lines. In one embodiment, a tie-breaker feature may be implemented for another approach to calculating grain information and generated missing image data.

In one embodiment, the present invention outputs the best orientation of the grain and an associated confidence value that may be utilized by a subsequent vertical filtering pass. On this pass an "End of Loopback Operation" interrupt may be set up. When the pass finishes, the interrupt occurs, for servicing by a 3:2 pulldown routine. This pulldown routine reads the double buffered counter values to obtain the raw data needed for the 3:2 pulldown detection, and determine if the current field should be weaved with the next or previous field.

In one embodiment, this determination is made before the "Weave and Scale" pass is executed if the 3:2 pulldown algorithm. Deinterlacing passes may not be skipped because the 3:2 algorithm may determine that the 3:2 sequence ended and that subsequent deinterlacing should be activated.

A spatially interpolated field generator 118 is operative to receive the filtered grain information 154 from the grain information filter 116. The spatially interpolated field generator 118 is operative to generate a spatially interpolated field 156, as noted in equations 9-10.

$$\text{SIFld}=f\{F(n-1)[y-1],F(n-1)[y+1],\text{graininfo}\} \qquad \text{Equation 9}$$

$$\text{SIFld}=(F(n-1)[y-1][x]+F(n-1)[y+1][x])/2 \qquad \text{Equation 10}$$

The embodiment of FIG. 1 further includes a base value generator 120. Similar to the motion map updater 106, the base value generator 120 is operative to receive video data inputs 140, 142 and 144. The base value generator 120 is also operative to receive the spatially interpolated field 156 from the spatially interpolated field generator 118. The base value generator 120 is operative to generate a base value 158, in response to Equation 11.

$$\text{BaseValue}=f\{\text{SpatiallyInterpolatedFld},F(n),F(n-2),F(n-4)\} \qquad \text{Equation 11}$$

Furthermore, in one embodiment, the base value 158 may be determined based on conditional that if ((|SpatiallyInterpolatedFld−F(n)|<|SpatiallyInterpolatedFld−F(n−2)|) && (|SpatiallyInterpolatedFld−F(n)|<|SpatiallyInterpolatedFld−F(n−4)1)), the BaseValue=F(n), otherwise if (abs(SpatiallyInterpolatedFld−F(n−2))<abs(SpatiallyInterpolatedFld−F(n−4))), the BaseValue=F(n−2); else BaseValue=F(n−4).

In this embodiment, further included is the missing video data generator 112. The missing video data generator 112 is operative to receive the maximum difference value 150, the spatially interpolated field 156 from the spatially interpolated field generator 118, and the base value 158 from the base value generator 120. The missing value generator 112 is operative to generate missing first video data 160 in accordance with Equations 12 and 13.

$$\text{MissingY}=f\{\text{BaseValue},\text{SpatiallyInterpolatedFld},\text{MaxDiff}\} \qquad \text{Equation 12}$$

$$\text{Missing}=\text{clamp}(\text{SpatiallyInterpolatedFld},\text{BaseValue}+\text{MaxDiff},\text{BaseValue}-\text{MaxDiff}). \qquad \text{Equation 13}$$

In one embodiment, the spatially interpolated data field, SpatiallyInterpolatedFld, is a clamped value). In another embodiment, the spatially interpolated field may be replaced with the averaging of the above and below lines in F(n−1), which provides Equation 14.

$$\text{MissingY}=f\{\text{BaseValue},(F(n-1)[y-1]+F(n-1)[y+1])/2,\text{MaxDiff}\} \qquad \text{Equation 14}$$

In one embodiment, the apparatus 100 further includes the UV bobber 126 which is operative to receive UV video data 136 from the field buffer 124. In accordance with known bobbing techniques, the bobber 126 generates missing UV data 162.

The weave and scale module 128 is operative to receive the missing first video data 160 from the missing data generator 112. The module 128 is further operative to receive the missing UV data 162. In one embodiment, the module 128 is further operative to receive a first frame of video data 164 from the field buffer 104 and first frame UV data 166 from the second field buffer 124. The weave and scale module 128 may therein generate image data 168 which may then be provided to a display device or to a frame buffer. In one embodiment, if the image data 168 is horizontally and vertically scaled, the image data 168 may be provided to the display device and if the image data 168 is vertically scaled, the image data 168 may be provided to the frame buffer further processing, such as further scaling.

In one embodiment, the copy UV pass may be different for video capture, wherein the UV data is 4:2:2 sub-sampled, and the Y and UV data are packed into the field buffers 104 and 124 respectively. To efficiently bob the UV using the bobber 126, the copy pass firsts copies the even lines of the field 136 (outputting 120 lines for an NTSC embodiment) and then copies the odd lines of the field 136 (outputting another 120 lines for the NTSC embodiment).

A final weave and scale pass using the weave and scale module 130, will weave these two sets of lines together to reproduce the original UV field of 240 lines. The weave and scale pass will also weave the current Y field with the missing Y field to produce a 480 lines of Y (for NTSC), as discussed in further detail below. In one embodiment, the weave and scale pass may thereupon scale up the UV twice as much as it scales the Y. For video capture sources, this is where the bobbing of the UV actually gets done, in the 4:2:0 to 4:2:2 conversion step. In this embodiment, the present invention dynamically controls a vertical UV scale alignment so that the vertically upscaled UV pixels are correctly aligned with the Y pixels.

Figure 2:
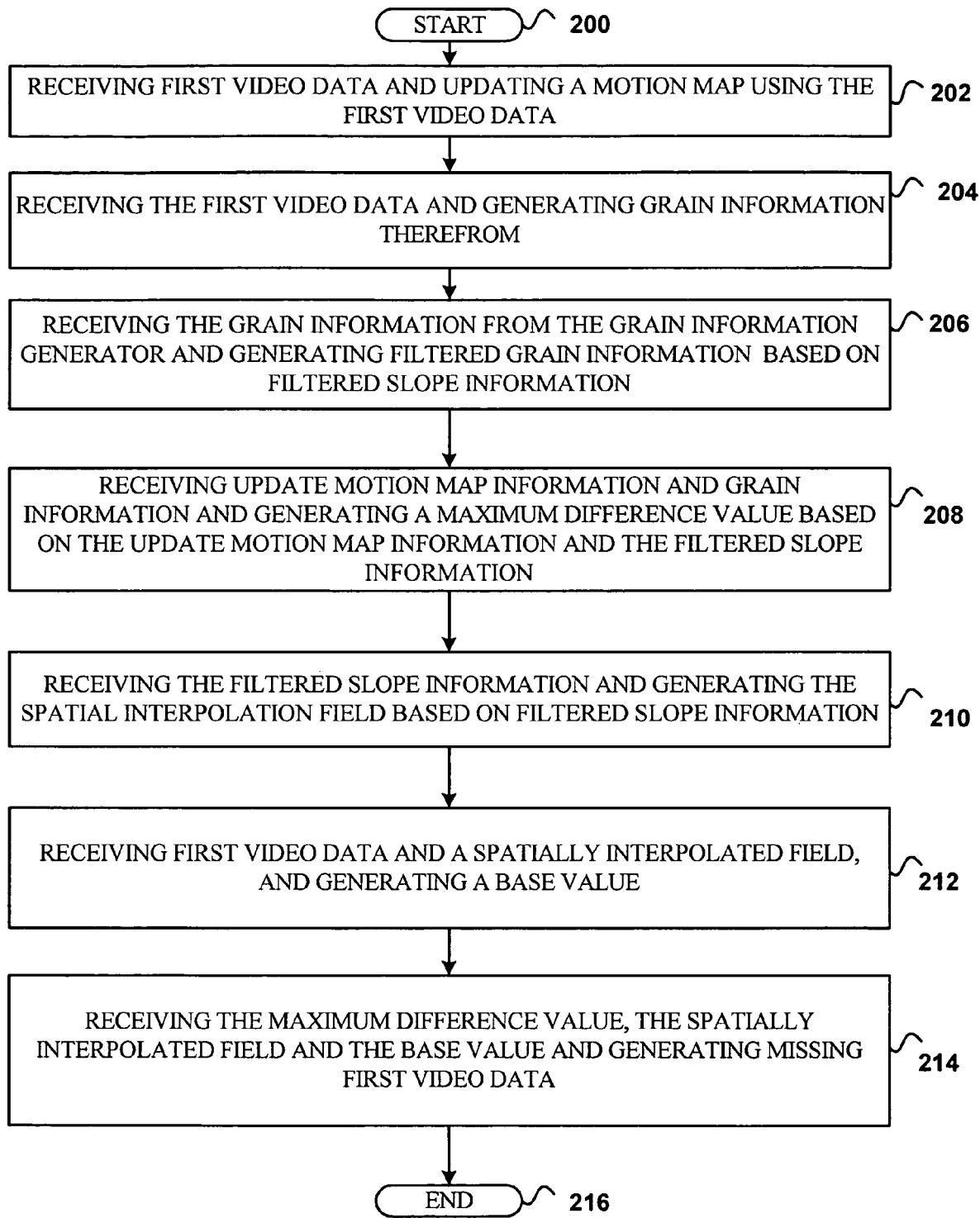
FIG. 2 illustrates a flowchart of the steps of a method for image rendering in accordance with one embodiment of the present invention.

FIG. 2 illustrates a flowchart of a method for image rendering in accordance with one embodiment of the present invention. The method begins, step 200, by receiving first video data and updating a motion map using the first video data, step 202. With respect to FIG. 1, the first video data may be Y data from a YUV formatted image data and the motion map may be updated in accordance with Equation 1. This step may be performed by the motion map updater 106 of FIG. 1.

Step 204 is receiving the first video data and generating grain information therefrom. This step may be performed by the grain information generator 114 of FIG. 1 in accordance with any suitable grain information generating technique as recognized by one having ordinary skill in the art or as described above with regards to FIG. 1.

Step 206 is receiving the grain information and generate filtered grain information such that a spatially interpolated field generator may generate the spatially interpolated field based on the filtered grain information. Step 206 may be performed by the grain information filter 114 and the spatially interpolated field generator in accordance with techniques as described above with respect to FIG. 1.

Step 208 is receiving updated motion map information and grain information to generate a maximum difference value based on the updated motion map information and the filtered grain information. The step may be performed by the maximum difference generator 110 of FIG. 1 in accordance with technique as described above.

Step 210 is receiving filtered grain information and generating the spatially interpolated field based on the filtered grain information. This step may be performed by the spatially interpolated field generator 118 in accordance with the technique described above with respect to FIG. 1.

Step 212 is receiving the first video data and a spatially interpolated field and generating a base value therefrom. This step may be performed by the base value generator 120 in accordance with approach described above with respect to FIG. 1.

Step 214 is receiving the maximum difference value, the spatially interpolated field and the base value to generate missing first video data. This step may be performed by the missing video data generator 112 in accordance with the technique described above with respect to FIG. 1.

Therefore, the present invention provides for improved image rendering through the effective utilization of video image data. The present invention, through the generation of the update motion map and generation and filter of grain information provide for the generation of the maximum difference value 150. Further with the filtered grain information, the spatially interpolated field 118 may be generated as well as a base value using the spatially interpolated field and portions or frame of the video image data. Thereupon, the missing video data generator 112 is operative to generate the missing video data using the base value 158, the spatially interpolated field 156 and the maximum difference value 150.

It should be understood that the implementation of other variations and modifications of the invention in its various aspects will be apparent to those of ordinary skill in the art, and that the invention is not limited by the specific embodiments described herein. For example, the computations of the method described above may be computed on any available processing device and field buffers 104 and 124 may be any suitable buffer for opening up available memory space in the MPEG buffers 102 and 122. It is therefore contemplated to cover by the present invention, any and all modifications, variations or equivalents that fallen within the spirit and scope of the basic underlying principles disclosed and claimed herein.

What is claimed is:

1. An apparatus for generating image rendering data, the apparatus comprising:
    a maximum difference value generator operative to receive update motion map information and grain information, wherein said grain information is derived from at least one input field, the maximum difference value generator operative to generate a maximum difference value based on the update motion map information and the filtered grain information;
    a base value generator operative to receive first video data at a first input of said base value generator, and a spatially interpolated field at a second input of said base value generator, the base value generator operative to generate a base value; and
    a missing video data generator operably coupled to the maximum difference value generator and the base value generator, the missing video data generator operative to receive the maximum difference value, the spatially interpolated field and the base value such that the missing video data generator is operative to generate missing first video data.

2. The apparatus of claim 1 further comprising:
    a motion map updater operably coupled to the maximum difference value generator, the motion map updater operative to receive the first video data and generate the update motion map using the first video data.

3. The apparatus of claim 1 further comprising:
    a grain information generator operative to receive the first video data and operative to generate grain information therefrom.

4. The apparatus of claim 3 further comprising:
    a grain information filter operably coupled to the grain information generator, the grain information filter operative to receive the grain information from the grain information generator and operative to generate filtered grain information.

5. The apparatus of claim 4 further comprising:
    a spatially interpolated field generator operably coupled to the grain information filter, the spatially interpolated field generator operative to receive the filtered grain information and operative to generate the spatially interpolated field based on filtered grain information.

6. An apparatus for image rendering, the apparatus comprising:
a motion map updater operative to receive first video data and update a motion map using the first video data;
a grain information generator operative to receive the first video data and operative to generate grain information therefrom, wherein said grain information is derived from at least one input field;
a spatially interpolated field generator operative to receive the grain information and operative to generate a spatially interpolated field; and
a base value generator operative to receive the first video data at a first input of said base value generator, and the spatially interpolated field at a second input of said base value generator, the base value generator operative to generate a base value.

7. The apparatus of claim 6 further comprising:
a maximum difference value generator operably coupled to the motion map updater, operative to generate a maximum difference value based on the update motion map.

8. The apparatus of claim 7 further comprising:
a missing video data generator operably coupled to the maximum difference value generator and the base value generator, operative to receive the maximum difference value, the spatially interpolated field and the base value such that the missing video data generator is operative to generate missing first video data.

9. The apparatus of claim 6 wherein the first video data is Y video data.

10. The apparatus of claim 6 further comprising:
a grain information filter operably coupled to the grain information generator and the spatially interpolated field generator, operative to receive the grain information from the grain information generator and operative to generate filtered grain information such that the spatially interpolated field generator generates the spatially interpolated field based on filtered grain information.

11. A method for image rendering, the method comprising:
updating a motion map using the first video data;
generating grain information using the first video data, wherein said grain information is derived from at least one input field;
generating a spatially interpolated field using the grain information; and
generating a base value using the first video data received at a first input of a base value generator and the spatially interpolated field received at a second input of said base value generator.

12. The method of claim 11 further comprising:
generating a maximum difference value based on the updated motion map.

13. The method of claim 12 further comprising:
generating missing first video data in response to the maximum difference value, the spatially interpolated field and the base value.

14. The method of claim 11 wherein the first video data is Y video data.

15. The method of claim 11 further comprising:
generating filtered grain information from the grain information such that the maximum difference value and the spatially interpolated field are generated using the filtered grain information.

16. An apparatus for image rendering, the apparatus comprising:

a grain information generator operative to receive the first video data and operative to generate grain information therefrom, wherein said grain information is derived from at least one input field;
a grain information filter operably coupled to the grain information generator, operative to receive the grain information from the grain information generator and operative to generate filtered grain information;
a spatially interpolated field generator operably coupled to the grain information filter, operative to receive the filtered grain information and operative to generate a spatially interpolated field based on filtered grain information; and
a base value generator operative to receive the first video data at a first input of said base value generator, and the spatially interpolated field at a second input of said base value generator, the base value generator operative to generate a base value.

17. The apparatus of claim 16 further comprising:
a motion map updater operative to receive the first video data and update a motion map using the first video data; and
a maximum difference value generator operably coupled to the motion map updater, operative to receive the motion map and the filtered grain information, the maximum difference value generator operative to generate a maximum difference value based on the update motion map and the filtered grain information.

18. An apparatus for image rendering, the apparatus comprising:
a first buffer operative to receive first video data;
a motion map updater operative to receive the first video data and update a motion map using the first video data;
a grain information generator operative to receive the first video data and operative to generate grain information therefrom, wherein said grain information is derived from at least one input field;
a grain information filter operative to receive the grain information and operative to filter the grain information to generate filtered grain information;
a spatially interpolated field generator operative to receive the filtered grain information and operative to generate a spatially interpolated field;
a maximum difference value generator operative to generate a maximum difference value based on the update motion map;
a base value generator operative to receive the first video data at a first input of said base value generator, and the spatially interpolated field at a second input of said base value generator, the base value generator operative to generate a base value; and
a missing video data generator operative to receive the maximum difference value, the spatially interpolated field and the base value such that the missing video data generator is operative to generate missing first video data.

19. The apparatus of claim 18 further comprising:
a second buffer operative to receive second video data;
a second video data bobber operative to bob the second video data to generate missing second video data; and
a weaver and scaler operative to receive the missing second video data and the missing first video data and operative to generate output image data.

20. The apparatus of claim 19 further comprising:
a frame buffer operative to receive the output image when the output image is vertically scaled by the weaver and scaler.

21. The apparatus of claim 19 further comprising:
a display device operative to receive the output image when the output image is vertically scaled and horizontally scaled by the weaver and scaler.

22. The apparatus of claim 19 wherein the first video data is Y data and the second video data is UV data, the apparatus further comprising:
a second video data even line buffer operably coupled to the weaver and scaler; and
a second video data odd line buffer operably coupled to the weaver and scaler such that the weaver and scaler is operative to receive even line second video data from the second video data even line buffer, the weaver and scaler is operative to receive odd line second video data from the second video odd line buffer such that the weaver and scaler combines the odd line second video data, the even line second video data and missing first video data to generate the output image data.

23. The apparatus of claim 19 wherein the first buffer and the second buffer are ring buffers.

24. The apparatus of claim 18 further comprising:
an initial first video buffer operative to receive the first video data; and
a copier operative to copy the first video data from the initial first video buffer to the first buffer.

25. An apparatus for image rendering comprising:
a first image processing device including:
a grain information generator operative to receive a first video data and operative to generate grain information therefrom, wherein said grain information is derived from at least one input field;
a maximum difference value generator operative to generate a maximum difference value based on an update motion map and said grain information;
a base value generator operative to receive first video data at a first input of said base value generator and a spatially interpolated field at a second input of said base value generator, the base value generator operative to generate a base value; and
a missing video data generator operative to receive a maximum difference value, the spatially interpolated field and the base value such that the missing video data generator is operative to generate missing first video data; and
a second image processing device operably coupled to the first image processing device, the second image processing device including:
a second buffer operative to receive second video data;
a second video data bobber operative to bob the second video data to generate missing second video data;
a weaver and scaler operative to receive the missing second video data and the missing first video data and operative to generate output image data.

26. The apparatus of claim 25, wherein the first processing device further includes:
a first buffer operative to receive the first video data;
a motion map updater operative to receive the first video data from the first buffer and update a motion map using the first video data;
a grain information filter operative to receive the grain information and operative to filter the grain information to generate filtered grain information;
a spatially interpolated field generator operative to receive the filtered grain information and operative to generate the spatially interpolated field.

27. The apparatus of claim 26, wherein the second processing device further includes:
a copier operative to copy first video data from an initial first video buffer to the first buffer.

28. The apparatus of claim 25 wherein the first buffer and the second buffer are ring buffers.

29. The apparatus of claim 25 wherein the first image processing device further includes:
a second motion map updater operative to receive the first video data and update a second motion map using the first video data;
a second grain information generator operative to receive the first video data and operative to generate second grain information therefrom;
a second grain information filter operative to receive the second grain information and operative to filter the second grain information to generate filtered second grain information;
a second spatially interpolated field generator operative to receive the filtered second grain information and operative to generate a second spatially interpolated field;
a second maximum difference value generator operative to generate a second maximum difference value based on the second update motion map;
a second base value generator operative to receive the first video data and the second spatially interpolated field, the second base value generator operative to generate a second base value; and
a second missing video data generator operative to receive the second maximum difference value, the second spatially interpolated field and the second base value such that the second missing video data generator is operative to generate second missing first video data.

30. The apparatus of claim 25 wherein the first video data is high definition image data.

* * * * *

UNITED STATES PATENT AND TRADEMARK OFFICE
CERTIFICATE OF CORRECTION

PATENT NO. : 7,633,549 B2  Page 1 of 1
APPLICATION NO. : 10/837991
DATED : December 15, 2009
INVENTOR(S) : Philip Swan It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1320 days.

Signed and Sealed this

Twenty-first Day of December, 2010

David J. Kappos
*Director of the United States Patent and Trademark Office*